(12) United States Patent
Abe

(10) Patent No.: US 11,256,495 B2
(45) Date of Patent: Feb. 22, 2022

(54) ONBOARD SYSTEM AND ECU

(71) Applicant: FUJITSU LIMITED, Kawasaki (JP)

(72) Inventor: Yasuhiko Abe, Niiza (JP)

(73) Assignee: FUJITSU LIMITED, Kawasaki (JP)

( * ) Notice: Subject to any disclaimer, the term of this patent is extended or adjusted under 35 U.S.C. 154(b) by 43 days.

(21) Appl. No.: 16/777,037

(22) Filed: Jan. 30, 2020

(65) Prior Publication Data

US 2020/0249930 A1 Aug. 6, 2020

(30) Foreign Application Priority Data

Jan. 31, 2019 (JP) .............................. JP2019-016050

(51) Int. Cl.
| | | |
|---|---|---|
| *G06F 9/44* | (2018.01) | |
| *G06F 8/65* | (2018.01) | |
| *G05B 15/02* | (2006.01) | |
| *G06F 8/71* | (2018.01) | |
| *G06F 9/4401* | (2018.01) | |

(52) U.S. Cl.
CPC .............. *G06F 8/65* (2013.01); *G05B 15/02* (2013.01); *G06F 8/71* (2013.01); *G06F 9/4401* (2013.01)

(58) Field of Classification Search
CPC ....................................................... G06F 8/65
USPC ....................................................... 717/170
See application file for complete search history.

(56) References Cited

U.S. PATENT DOCUMENTS

| | | | | |
|---|---|---|---|---|
| 8,621,053 B2* | 12/2013 | Fukata | ................ | G06F 9/44552 709/222 |
| 10,496,398 B2* | 12/2019 | Fox | ........................ | G06F 16/188 |
| 10,983,785 B1* | 4/2021 | Bryan | ........................ | G06F 8/66 |
| 2009/0300595 A1* | 12/2009 | Moran | ...................... | G06F 8/65 717/170 |

(Continued)

FOREIGN PATENT DOCUMENTS

| | | |
|---|---|---|
| JP | 2009-053920 A | 3/2009 |
| JP | 2013-250923 A | 12/2013 |
| JP | 2018-072920 A | 5/2018 |

OTHER PUBLICATIONS

EESR—Extended European Search Report of European Patent Application No. 20154571.2 dated Oct. 23, 2020. ** References cited in the EESR were previously submitted in IDS filed on Sep. 2, 2020.

(Continued)

*Primary Examiner* — Evral E Bodden
(74) *Attorney, Agent, or Firm* — Fujitsu Patent Center

(57) ABSTRACT

An onboard system comprising, a plurality of electronic control units (ECUs) coupled together via a network and including a first ECU and a second ECU, the first ECU including a first memory and a first processor coupled to the first memory, the second ECU including a second memory and a second processor coupled to the second memory, wherein, the first memory and the second memory configured to store a list recording a combination of identification information of software of the plurality of ECUs, the first processor is configured to: compare identification information of the list stored in the first memory against identification information of the list stored in the second memory and identify a list which is newer in the lists, and determine whether or not a combination of software of the plurality of (Continued)

ECUs is aligned based on a combination of the software identification information.

21 Claims, 17 Drawing Sheets

(56) References Cited

U.S. PATENT DOCUMENTS

| | | |
|---|---|---|
| 2014/0047430 A1 | 2/2014 | Kanematsu |
| 2014/0059534 A1 | 2/2014 | Daum et al. |
| 2014/0282470 A1 | 9/2014 | Buga et al. |
| 2016/0170775 A1* | 6/2016 | Rockwell ............ G06F 13/4282 713/100 |
| 2019/0265966 A1 | 8/2019 | Shimomura |

OTHER PUBLICATIONS

EESR—Partial European Search Report of European Patent Application No. 201545712 dated Jul. 22, 2020.

\* cited by examiner

FIG.4

| LIST VERSION | MASTER ECU SW Ver | SLAVE ECU 20 SW Ver | SLAVE ECU 30 SW Ver |
|---|---|---|---|
| 002 | 001 | 002 | 001 |

FIG.9

| ECU TYPE: | LIST VERSION | MASTER ECU SW Ver | SLAVE ECU 20 SW Ver | SLAVE ECU 30 SW Ver | |
|---|---|---|---|---|---|
| MASTER ECU | 003 | 001 | 002 | 002 | } Lm |
| SLAVE ECU 20 | 003 | 001 | 002 | 002 | } Ls20 |
| SLAVE ECU 30 | 001 | 001 | 001 | 001 | } Ls30 |

| ECU TYPE: | LIST VERSION | MASTER ECU SW Ver | SLAVE ECU 20 SW Ver | SLAVE ECU 30 SW Ver | |
|---|---|---|---|---|---|
| MASTER ECU | 002 | 002 | 001 | 001 | } Lc |

FIG.11

| ECU TYPE | SW Ver | LIST VERSION |
|---|---|---|
| SLAVE ECU 20 | 002 | 002 |
| SLAVE ECU 30 | 001 | 002 |

| ECU TYPE: | LIST VERSION | MASTER ECU SW Ver | SLAVE ECU 20 SW Ver | SLAVE ECU 30 SW Ver |
|---|---|---|---|---|
| MASTER ECU | 001 | 001 | 001 | 001 |
| SLAVE ECU 20 | 001 | 001 | 001 | 001 |
| SLAVE ECU 30 | 001 | 001 | 001 | 001 |

L3-2

| ECU TYPE: | LIST VERSION | MASTER ECU SW Ver | SLAVE ECU 20 SW Ver | SLAVE ECU 30 SW Ver |
|---|---|---|---|---|
| MASTER ECU | 002 | 002 | 001 | 001 |
| SLAVE ECU 20 | 002 | 002 | 001 | 001 |
| SLAVE ECU 30 | 002 | 002 | 001 | 001 |

L3-3

| ECU TYPE: | LIST VERSION | MASTER ECU SW Ver | SLAVE ECU 20 SW Ver | SLAVE ECU 30 SW Ver |
|---|---|---|---|---|
| MASTER ECU | 001 | 001 | 001 | 001 |
| SLAVE ECU 20 | 002 | 002 | 001 | 001 |
| SLAVE ECU 30 | 002 | 002 | 001 | 001 |

L3-4

| ECU TYPE: | LIST VERSION | MASTER ECU SW Ver | SLAVE ECU 20 SW Ver | SLAVE ECU 30 SW Ver |
|---|---|---|---|---|
| MASTER ECU | 002 | 002 | 001 | 001 |
| SLAVE ECU 20 | 002 | 002 | 001 | 001 |
| SLAVE ECU 30 | 002 | 002 | 001 | 001 |

SLAVE ECU 30 SW Ver 001-001 | SLAVE ECU 30 SW Ver 001-001 | SLAVE ECU 30 SW Ver 001-001 | SLAVE ECU 30 SW Ver 001-001

SLAVE ECU 20 SW Ver 001-001 | SLAVE ECU 20 SW Ver 001-001 | SLAVE ECU 20 SW Ver 001-001 | SLAVE ECU 20 SW Ver 001-001

MASTER ECU SW Ver 001-001 →V2→ MASTER ECU SW Ver 002-001 →E1→ MASTER ECU SW Ver 001-001 | MASTER ECU SW Ver 001-001

ONBOARD SYSTEM AND ECU

CROSS-REFERENCE TO RELATED APPLICATION

This application is based upon and claims the benefit of priority of the prior Japanese Patent Application No. 2019-016050, filed on Jan. 31, 2019, the entire contents of which are incorporated herein by reference.

FIELD

The embodiments discussed herein are related to an onboard system and an electronic control unit (ECU).

BACKGROUND

Hitherto there are known vehicle control units that operate under plural firmware. In such a vehicle control unit, alignment verification is performed of a version list managed by a server or the like against versions in the vehicle control units, and firmware is downloaded from a server when there is no alignment. More specifically, such a vehicle control unit first determines whether or not there is a lack of alignment between the version management list and gathered versions. Then when determined that the actual versions and the versions of each firmware as listed on the version control list differ from each other, the vehicle control unit transmits the actual versions and a representative version listed on the version control list to the server. The vehicle control unit then updates the firmware installed on the vehicle control unit using the firmware for updating provided by the server.

Systems are also known that, when a version upgrade is performed to an ECU program, proactively prevent ECU operational malfunction from occurring due to version misaligned with a program on another ECU connected by bus. In such a system a server is provided to hold a version upgrade program as an update from the program currently installed on an electronic control unit. Either one of the electronic control units or the server holds information about dependency relationship between the current program and the version upgrade program and determines whether or not it is possible to update to the version upgrade program from the dependency relationship information. When determined to be updatable, either the one electronic control unit or the server transmits the version upgrade program held on the server to the electronic control unit.

RELATED PATENT DOCUMENTS

Japanese Laid-Open Patent Publication No. 2013-250923
Japanese Laid-Open Patent Publication No. 2009-053920

SUMMARY

According to an aspect of the embodiments, an onboard system comprising: a plurality of electronic control units (ECUs) coupled together via a network and including a first ECU and a second ECU, the first ECU including a first memory and a first processor coupled to the first memory, the second ECU including a second memory and a second processor coupled to the second memory, wherein, the first memory and the second memory configured to store a list recording a combination of identification information of software of the plurality of ECUs, the first processor is configured to: in response to starting up the onboard system, compare identification information of the list stored in the first memory against identification information of the list stored in the second memory and identify a list which is newer in the lists, and determine whether or not a combination of software of the plurality of ECUs is aligned based on a combination of the software identification information recorded in the identified list.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory diagram to explain a list stored on a list storage section of a slave ECU.

FIG. 9 is an explanatory diagram to explain selection of a list during fallback operation.

FIG. 11 is an explanatory diagram to explain an example of operation when the present embodiment is being applied.

FIG. 13 is an explanatory diagram to explain an example of operation when the present embodiment is being applied.

DESCRIPTION OF EMBODIMENTS

In the case of related technology, there are dependency relationships between the software versions of each of the ECUs due to the ECUs being linked together and operating together. Sometimes a configuration is adopted that includes a master ECU to manage the dependency relationships and includes slave ECUs that notify their own information.

In such cases, for example, the version of software to operate each of the slave ECUs is managed by the master ECU, with a list recorded with the versions of software of each of the slave ECUs stored in a storage section of the master ECU.

However, when the ECUs are exchanged, sometimes this results the list recorded with the software versions of each of the ECUs being that as initialized. A discrepancy accordingly appears between the versions of the software on each of the slave ECUs as recognized by the master ECU and the versions of the software actually operating on each of the slave ECUs.

The link between the master ECU and each of the slave ECUs might not be performed appropriately in such cases, and this sometimes leads to no longer being able to operate the onboard system. There is accordingly an issue of a need arising to verify a combination of identification information of software actually being operated on plural ECUs when an ECU holding a list recorded with software identification information has been exchanged.

Detailed explanation follows regarding an example of an embodiment of technology disclosed herein, with reference to the drawings.

Onboard System of an Embodiment

Figure 1:
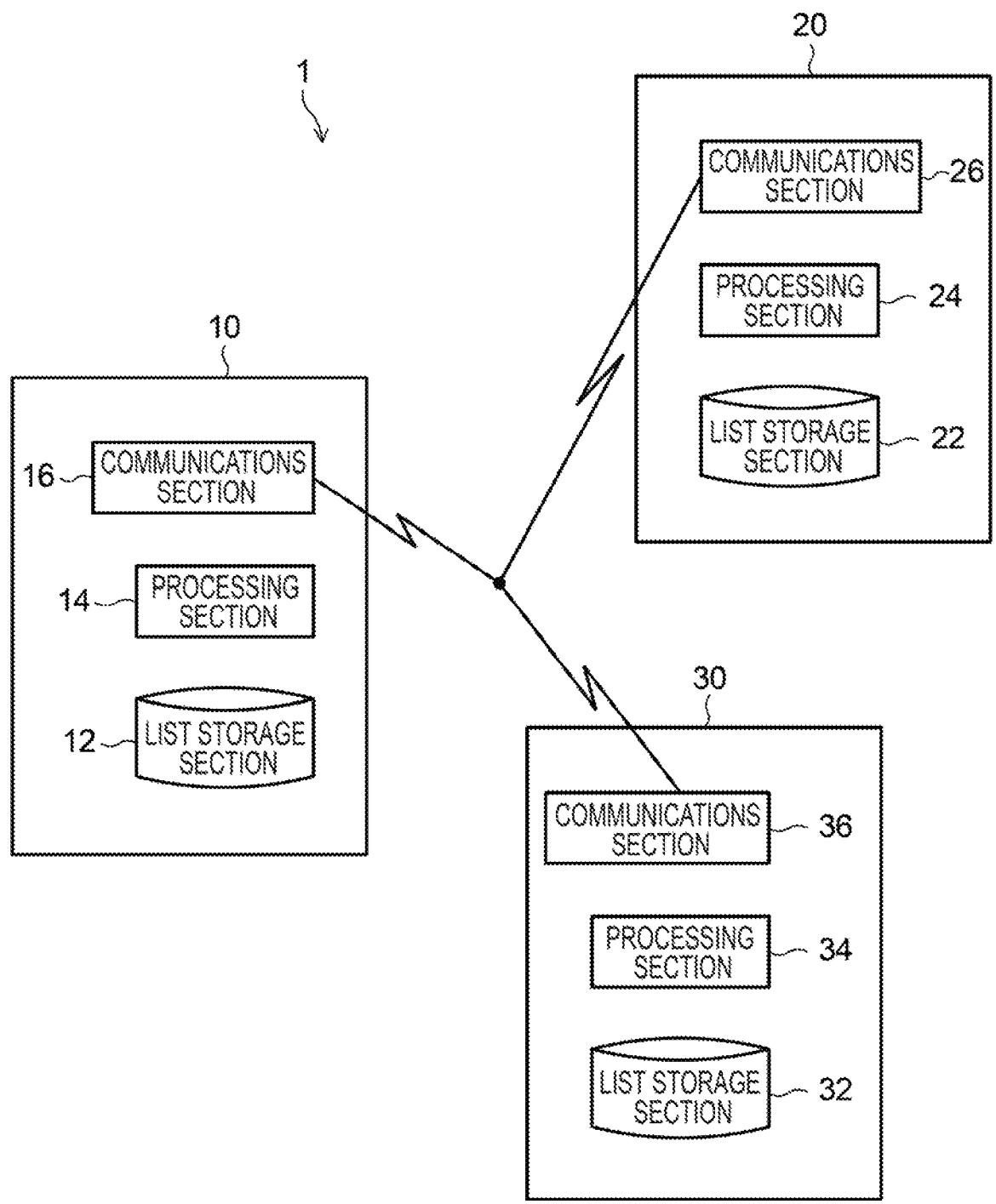
FIG. 1 is a schematic block diagram of an onboard system according to an embodiment.

As illustrated in FIG. 1, an onboard system 1 according to an embodiment includes plural ECUs. In the present embodiment an example will be explained of a case in which an onboard system is realized by a single master ECU and two slave ECUs. A master ECU 10 is an example of a first ECU of technology disclosed herein. A slave ECU 20 and a slave ECU 30 are examples of a second ECU of technology disclosed herein.

In the example illustrated in FIG. 1, the onboard system 1 according to the embodiment includes the master ECU 10, the slave ECU 20, and the slave ECU 30. The master ECU 10, the slave ECU 20, and the slave ECU 30 are connected together so as to be capable of communicating with each other.

Versions of software in each of the ECUs need to be aligned in order to operate the plural ECUs installed to a vehicle. To do this the use of software identification information might be considered in order to identify the versions of software in each of the ECUs (hereafter referred to simply as "software versions") so as to verify whether or not the software versions of each of the ECUs are aligned with each other.

When such an approach is adopted, for example, the management of software versions of each of the ECUs is made easier by employing a list storing the software versions of each of the ECUs all together. More specifically, the software versions of the software to operate a given ECU can be verified by reference to the software version of each of the ECUs as recorded in such a list.

For example, in cases in which the list is stored on a server, at least one ECU out of the plural ECUs installed to the vehicle communicates with the server when the onboard system is started up, and references the list stored on the server. The software versions of the plural ECUs installed in the vehicle are then able to be verified at the vehicle side in this manner. Operation of each of the ECUs is then started in cases in which there is alignment of the software versions of the plural ECUs so as to enable the onboard system to be operated appropriately.

However, sometimes communication with the server is not achievable at the start up of each of the ECUs. In such cases the ECU installed in the vehicle is not able to reference the list, and the software versions of the plural ECUs are not able to be verified. Such cases result in the onboard system not being able to be started up due to not being able to verify with which software version to operate each of the plural ECUs installed to the vehicle.

A conceivable configuration to adopt in such circumstances is one in which the list is held in the onboard system, and the software versions of each of the ECUs is verified within the vehicle. However, ECUs are sometimes exchanged. In such cases, when the ECU holding the list (for example, a master ECU) has been exchanged, then the latest list is no-longer present, and the alignment of software versions of each of the ECUs is not verifiable.

Figure 2:
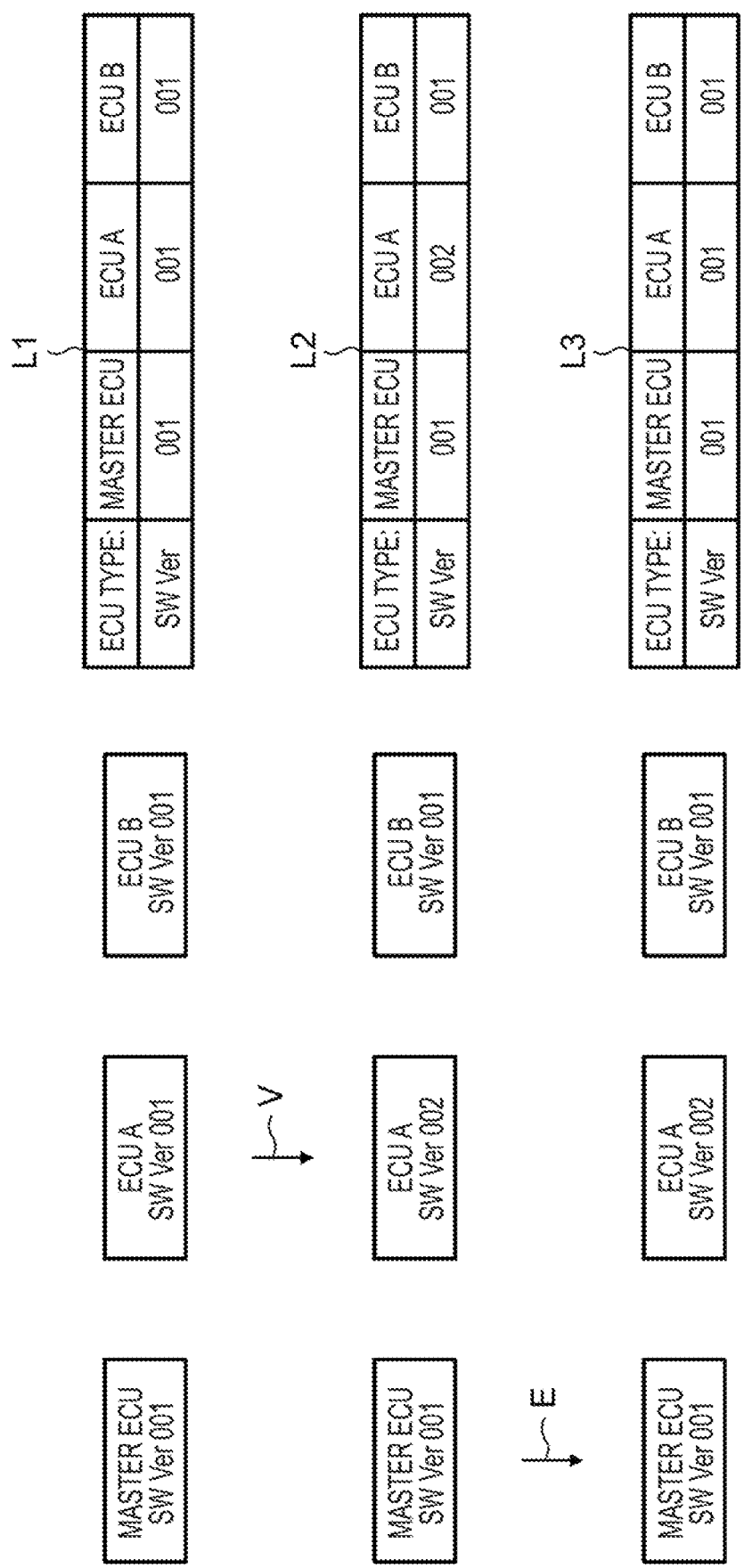
FIG. 2 is an explanatory diagram to explain alignment of software versions.

FIG. 2 is an explanatory diagram to explain software version alignment. In the drawings the software version is expressed as "SW Ver". For example, as illustrated in FIG. 2, the respective software versions on each of plural ECUs are recorded in a list. A list L1 is recorded with "001" as a software version of the master ECU, "001" as a software version of an ECU A, and "001" as a software version of an ECU B.

Consider, as illustrated by V in FIG. 2, a case in which the software of the ECU A is updated, and the software version of the ECU A becomes "002". In such a case the list L1 is updated to list 12, and the "001" for the software version of the ECU A is rewritten as "002".

However, in cases in which the master ECU has been exchanged after the software of the ECU A has been updated, as illustrated by E in FIG. 2, then the list in the storage section of the master ECU becomes that of the initial state L3. In this case the software version of the software actually operating the ECU A does not match the software version of the ECU A as recorded on the list L3.

In such cases the onboard system is not able to determine whether or not it is OK to operate each of the ECUs since the software versions actually operating are not aligned with the software versions recorded on the list.

A configuration might be considered in which, when exchanging the master ECU, a list stored on a new master ECU is updated to the latest list. However, depending on the location where the exchange work is being performed, there might be cases in which the list is not updatable to the latest list when the master ECU is being exchanged, which might lead to the issue described above still occurring.

In order to address this, the onboard system 1 of the present embodiment verifies the alignment of software versions of each of the ECUs by verification at the vehicle side, without communicating with an external server. Note that even in cases in which the ECU holding the list recorded with the software versions of each of the ECUs has been exchanged in the onboard system 1 of the present embodiment, the alignment of the software versions of each of the ECUs is verified on the vehicle side without communicating with an external server.

More specifically, each of the plural ECUs provided to the onboard system 1 of the present embodiment holds a list recorded with the software versions of each of the ECUs. The master ECU 10 of the onboard system 1 of the present embodiment acquires the software versions of each of the ECUs when the onboard system 1 is started up, and also acquires identification information to identify the lists being held by each of the ECUs (hereafter simply referred to as the "list version"). The master ECU 10 identifies the latest list based on the list versions, and updates its own list to the latest list.

The master ECU 10 determines whether or not the combination of software versions of each of the ECUs as recorded in the latest list is aligned with the combination of software versions actually operating in each of the ECUs.

The software versions of each of the ECUs is expressed by "SW Ver XXX-YYY" below. "XXX" represents a software version of software that influences other ECUs. "YYY" represents the software version of software that does not influence other ECUs. The list of the present embodiment is recorded only with the "XXX" software versions.

The master ECU 10 of the present embodiment is an ECU that also holds past lists. However there is a limit to the number of lists holdable by the master ECU 10.

In cases in which the combination of software versions as recorded in the latest list does not match the combination of software versions actually operated by each of the ECUs, then there is a need to update software of ECUs for which the software versions do not match.

However, in order to update the software of the ECUs installed on the vehicle, the relevant software would need to be acquired by, for example, over-the-air (OTA) processing, representing communication processing between the onboard system 1 and an external server.

Sometimes software update processing by OTA takes some time to perform. Thus the master ECU 10 of the onboard system 1 of the present embodiment performs control processing to select a list in which there is conformance of the software versions of each of the ECUs so as to operate each of the ECUs using the software versions recorded in the selected list. Adopting such an approach means that startup of the onboard system is realizable without performing software update processing by OTA, even in cases in which there is an ECU present that needs a software update.

More detailed explanation follows.

As illustrated in FIG. 1, the master ECU 10 has a functional configuration including a list storage section 12, a processing section 14, and a communications section 16. As illustrated in FIG. 1, the slave ECU 20 has a functional configuration including a list storage section 22, a processing section 24, and a communications section 26. The slave ECU 30 has a functional configuration including a list storage section 32, a processing section 34, and a communications section 36.

Master ECU

A list recorded with the respective software versions for the master ECU 10, the slave ECU 20, and the slave ECU 30 is stored in the list storage section 12 of the master ECU 10.

Figure 3:
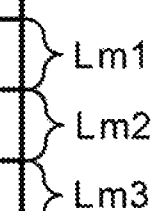
FIG. 3 is an explanatory diagram to explain a list stored on a list storage section of a master ECU.

FIG. 3 is an explanatory diagram to explain the list stored in the list storage section 12 of the master ECU 10. As illustrated in FIG. 3, the list version of the list held by the master ECU 10 is stored in association with the software version of the master ECU 10 in the list stored in the list storage section 12 of the master ECU 10. The software version of the master ECU 10 and the software version of the slave ECU 20 are also stored in association with each other in the list stored in the list storage section 12 of the master ECU 10.

For example, as illustrated in FIG. 3, the list version "001" of the list Lm1 is stored in the list Lm1 in association with a software version "001" of the master ECU 10. The software version "001" of the slave ECU 20 is also stored on the list Lm1 in association with a software version "001" of the slave ECU 30.

Note that older lists are also stored in the list storage section 12 of the master ECU 10. Thus, as illustrated in FIG. 3, there are list versions older than the list version "003" of the list Lm3, with the list Lm1 of the list version "001" and the list Lm2 of the list version "002" also being stored in the list storage section 12 of the master ECU 10. These past lists are employed in the processing described later.

The processing section 14 of the master ECU 10 performs various processing. Details regarding the processing of the processing section 14 are described later. The communications section 16 of the master ECU 10 transceives information with the slave ECU and the slave ECU 30.

Slave ECU

A list recorded with the respective software versions of the master ECU 10, the slave ECU 20, and the slave ECU 30 is stored in the list storage section 22 of the slave ECU 20.

FIG. 4 is an explanatory diagram to explain the list stored in the list storage section 22 of the slave ECU 20. As illustrated in FIG. 4, the list stored in the list storage section 22 of the slave ECU 20 is a list in which the list version "002" of the list held by the slave ECU is stored in association with the software version "001" of the master ECU 10. The list stored in the list storage section 22 of the slave ECU 20 is also a list in which the software version "002" of the slave ECU 20 is stored in association with the software version "001" of the slave ECU 30.

Note that in contrast to in the list storage section 12 of the master ECU 10, each of the older versions of the list are not stored in the list storage section 22 of the slave ECU 20.

The processing section 24 of the slave ECU 20 performs various processing. Details regarding the processing of the processing section 24 are described later. The communications section 36 of the slave ECU 20 transceives information with the master ECU and with the slave ECU 30.

A similar list to that of the list storage section 22 of the slave ECU 20 is stored in the list storage section 32 of the slave ECU 30. The processing section 34 of the slave ECU and the communications section 36 of the slave ECU 30 include similar functions to those of the respective sections of the slave ECU 20, and detailed explanation thereof will be omitted. The list storage section 12, the list storage section 22, and the list storage section 32 are each examples of a storage section of the technology disclosed herein.

Figure 5:
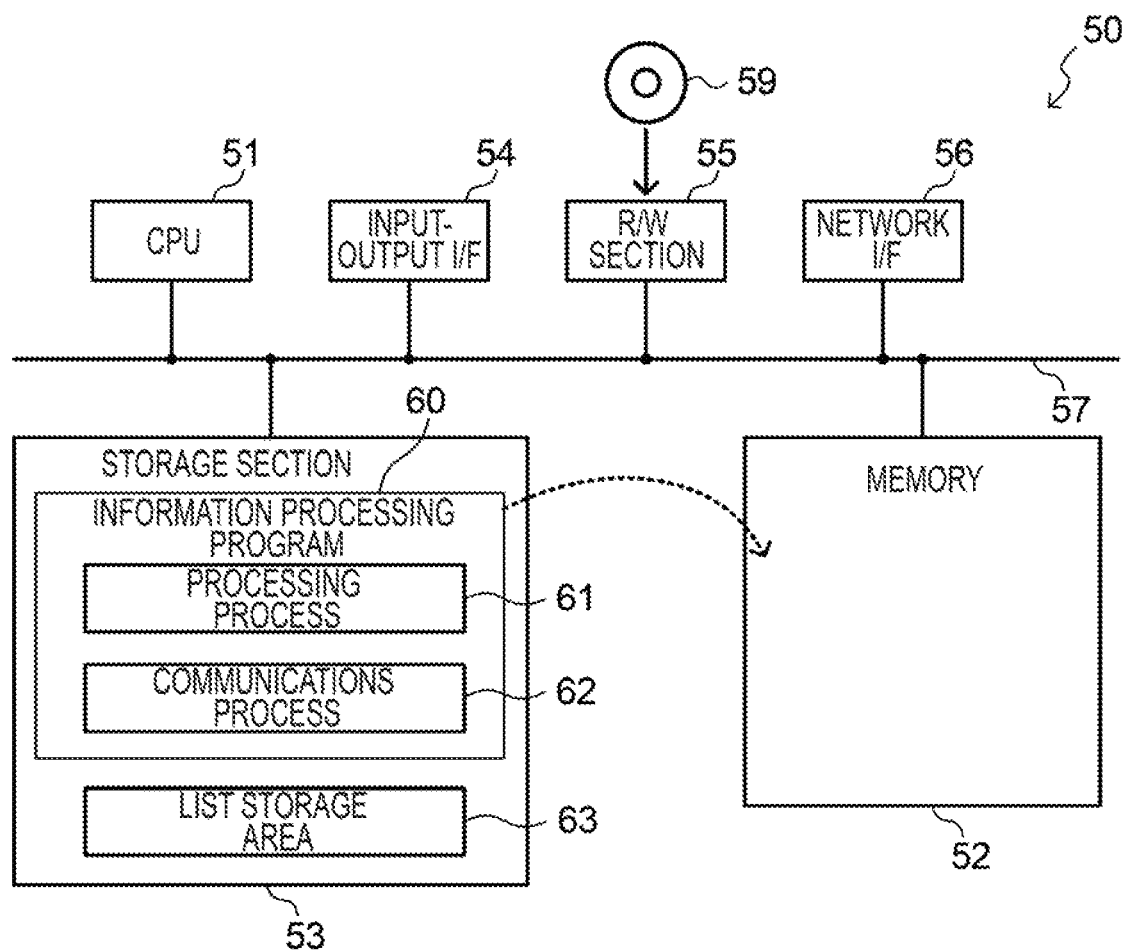
FIG. 5 is a block diagram of a schematic configuration of a computer that functions as a master ECU according to an embodiment.

The master ECU 10 of the onboard system 1 may, for example, be realized by a computer 50 as illustrated in FIG. 5. The computer 50 includes a central processing unit (CPU) 51, memory 52 serving as a temporary storage area, and a non-transitory storage section 53. The computer 50 also includes an input-output interface (I/F) 54 connected to an input-output device, and a read/write (R/W) section 55 to control the reading and writing of data to and from a recording medium 59. The computer 50 also includes a network I/F 56 for connection to a network such as the Internet. The CPU 51, the memory 52, the storage section 53, the input-output I/F 54, the R/W section 55, and the network I/F 56 are connected together through a bus 57.

The storage section 53 may be realized by a hard disk drive (HDD), a solid state drive (SSD), flash memory, or the like. An information processing program 60 that causes the computer 50 to function as the master ECU 10 of the onboard system 1 is stored in the storage section 53 serving as a storage medium. The information processing program 60 includes a processing process 61 and a communications process 62. Information to configure the list storage section 12 is stored in a list storage area 63.

The CPU 51 reads the information processing program 60 from the storage section 53, expands the information processing program 60 into the memory 52, and sequentially executes the processes of the information processing program 60. The CPU 51 operates as the processing section 14 illustrated in FIG. 1 by executing the processing process 61.

The CPU 51 operates as the communications section 16 illustrated in FIG. 1 by executing the communications process 62. The CPU 51 reads information from the list storage area 63 and expands the list storage section 12 into the memory 52. The computer 50 executing the information processing program 60 thereby functions as the master ECU 10 of the onboard system 1. The CPU 51 is hardware to execute the information processing program 60 software.

The functions implemented by the information processing program 60 may be implemented with, for example, a semiconductor integrated circuit, and more specifically with an Application Specific Integrated Circuit (ASIC) or the like.

Figure 6:
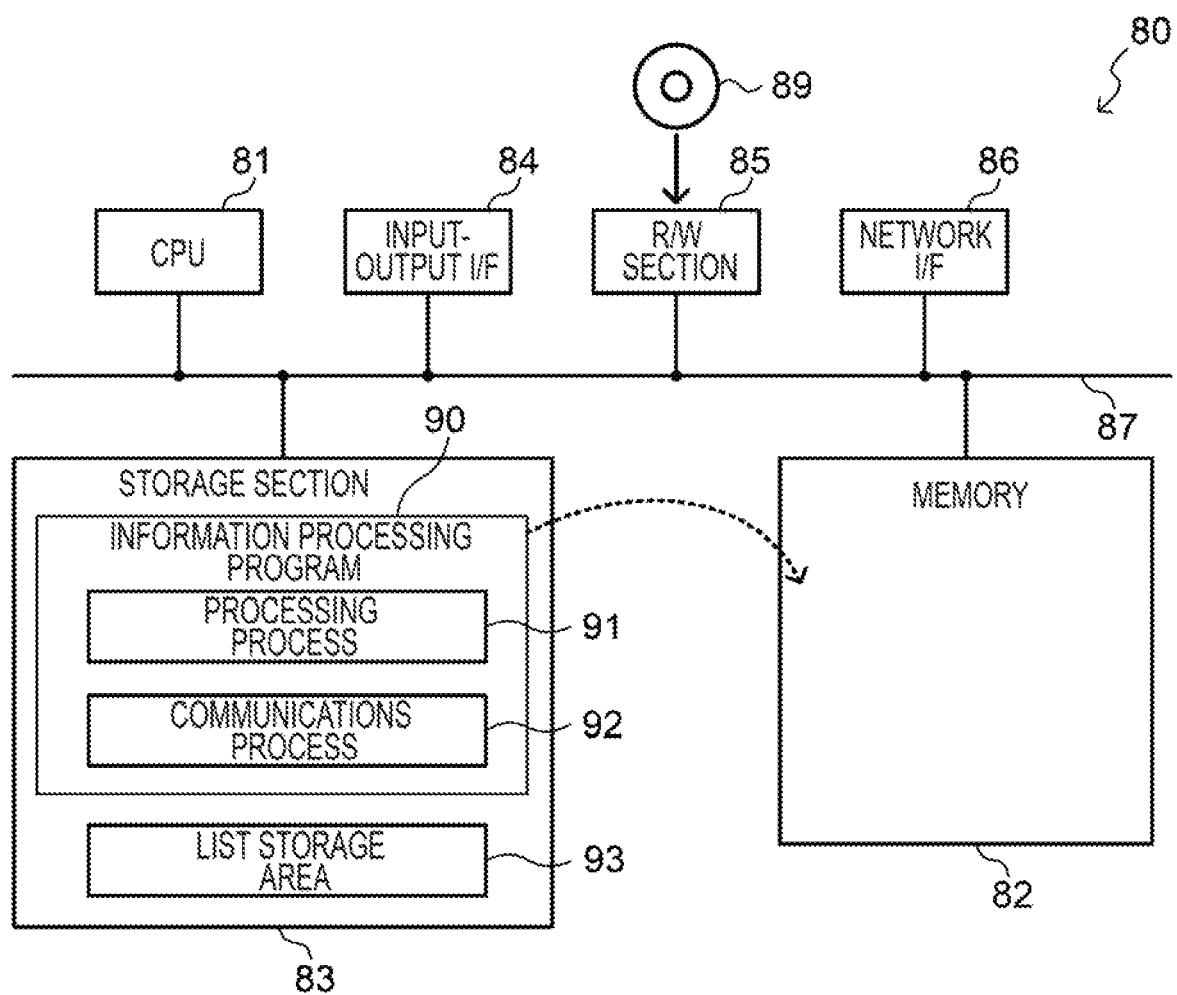
FIG. 6 is a block diagram illustrating a schematic configuration of a computer that functions as a slave ECU according to an embodiment.

The slave ECU 20 and the slave ECU 30 in the onboard system 1 may, for example, be implemented by a computer 80 as illustrated in FIG. 6. The computer 80 includes a CPU 81, memory serving as a temporary storage area 82, and a non-transitory storage section 83. The computer 80 also includes an input-output I/F 84 connected to an input-output device, and a read/write (R/W) section 85 to control the reading and writing of data to and from a recording medium 89. The computer 80 also includes a network I/F 86 for connection to a network such as the Internet. The CPU 81, the memory 82, the storage section 83, the input-output I/F 84, the R/W section 85, and the network I/F 86 are connected together through a bus 87.

The storage section 83 may be realized by a HDD, an SSD, flash memory, or the like. A processing program 90 to cause the computer 80 to function as the slave ECU 20 and the slave ECU 30 of the onboard system 1 is stored in the storage section 83 serving as a storage medium. The processing program 90 includes a processing process 91 and a communications process 92. Information to configure the list storage section 22 of the slave ECU 20 or the list storage section 32 of the slave ECU 30 is stored in a list storage area 93.

The CPU 81 reads the processing program 90 from the storage section 83, expands the processing program 90 into the memory 82, and sequentially executes processes of the processing program 90. The CPU 81 operates as the processing section 24 or the processing section 34 illustrated in FIG. 1 by executing the processing process 91. The CPU 81 operates as the communications section 26 or the communications section 36 illustrated in FIG. 1 by executing the communications process 92. The CPU 81 reads information from the list storage area 93 and expands the list storage section 22 or the list storage section 32 into the memory 82. The computer 80 executing the processing program 90 thereby functions as the slave ECU 20 and the slave ECU 30 of the onboard system 1. The CPU 81 is hardware to execute the processing program 90 software.

The functions implemented by the processing program 90 may be implemented with, for example, a semiconductor integrated circuit, and more specifically with an Application Specific Integrated Circuit (ASIC) or the like.

Figure 7:
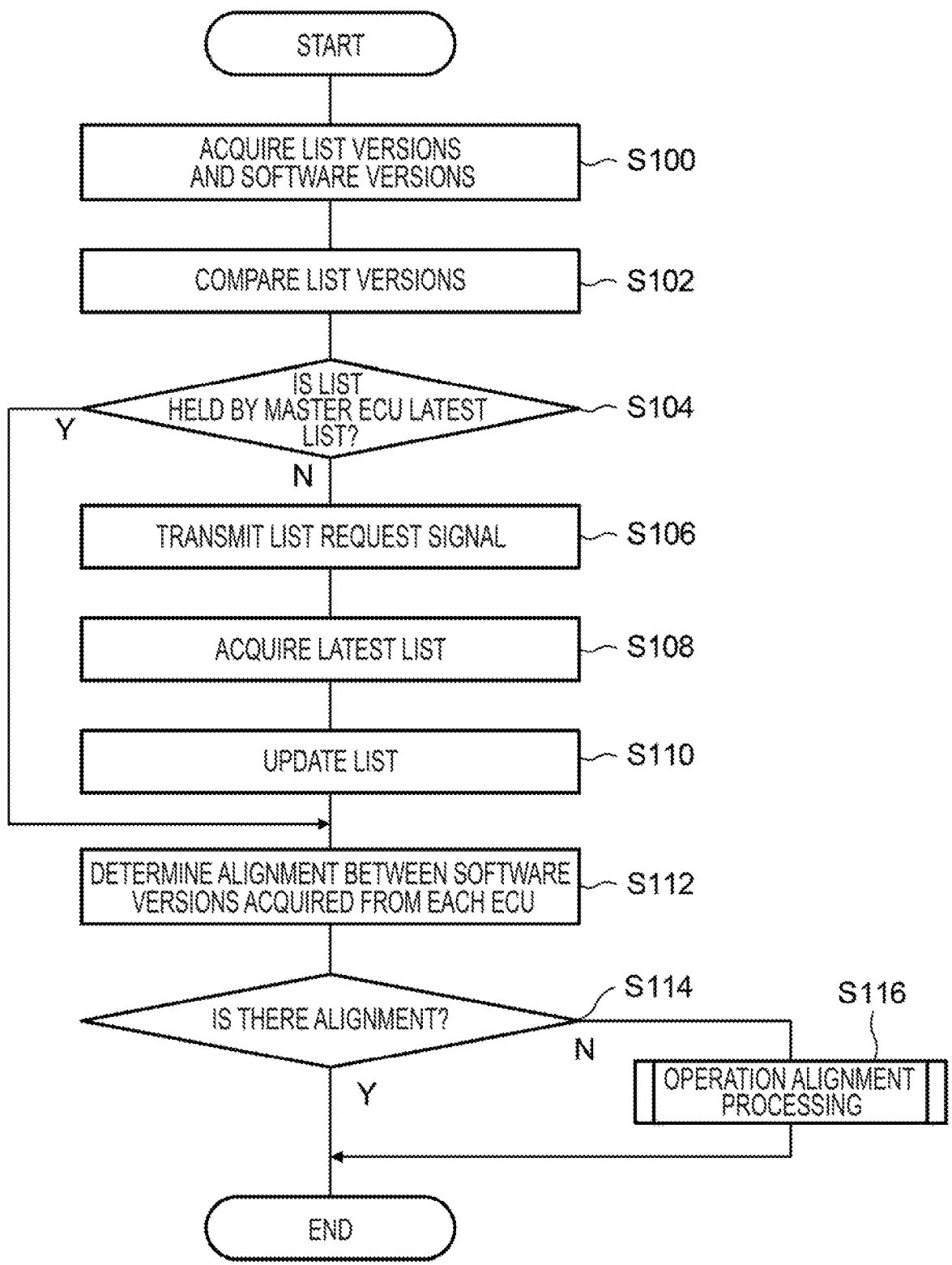
FIG. 7 is a flowchart illustrating an example of an information processing routine of the present embodiment.

Explanation follows regarding the operation of the onboard system 1 according to the present embodiment. First, in order to start up the onboard system 1, the master ECU 10 of the onboard system 1 executes an information processing routine as illustrated in FIG. 7.

At step S100, the processing section 14 of the master ECU 10 acquires the software versions of software actually operating in each of the plural ECUs, i.e. the slave ECU 20 and the slave ECU 30. More specifically, the processing section 14 of the master ECU 10 receives the software versions transmitted from the slave ECU 20 and the slave ECU through the communications section 16. The software versions of the slave ECU 20 and the slave ECU 30 are read from the lists in the respective list storage sections of the slave ECU 20 and the slave ECU 30, and transmitted to the master ECU 10. At step S10 the processing section 14 of the master ECU 10 also reads the software version of the software actually operated by the master ECU 10 as stored in a predetermined storage section (not illustrated in the drawings) of the master ECU 10.

At step S100, the processing section 14 of the master ECU 10 also acquires the list versions of the lists stored in the respective list storage sections of the plural ECUs, i.e. the slave ECU 20 and the slave ECU 30. More specifically, the processing section 14 of the master ECU 10 receives the list versions of the lists respectively held in the slave ECU 20 and the slave ECU 30 through the communications section 16.

At step S102, the processing section 14 of the master ECU 10 compares the list version of the latest list stored in the list storage section 12 of the master ECU 10 against each of the list versions obtained at step S100. The processing section 14 of the master ECU 10 then identifies the newest list from out of these lists based on the result of comparing the list versions. More specifically, the processing section 14 of the master ECU 10 identifies the latest list from among the lists held by each of the ECUs.

At step S104, the processing section 14 of the master ECU 10 determines whether or not the list stored in the list storage section 12 of the master ECU 10 is the latest list based on the comparison result obtained as step S102. Processing transitions to step S112 when the list stored in the list storage section 12 of the master ECU 10 is the latest list. Processing transitions to step S106 when the list stored in the list storage section 12 of the master ECU 10 is not the latest list.

At step S106, based on the comparison result obtained as step S102, the processing section 14 of the master ECU 10 uses the communications section 16 to transmit a request signal requesting a list to an ECU holding the latest list.

At step S108, the processing section 14 of the master ECU 10 acquires the latest list transmitted from the ECU holding the latest list.

At step S110, the processing section 14 of the master ECU 10 updates the list stored in the list storage section 12 to the latest list acquired at step S108. The list stored in the list storage section 12 of the master ECU 10 is accordingly the latest list.

At step S112, the processing section 14 of the master ECU 10 verifies alignment between the respective software versions of each of the ECUs as recorded in the latest list of the list storage section 12 against the respective software versions acquired at step S100. More specifically, the processing section 14 of the master ECU 10 compares the combination of software versions of each of the ECUs as recorded in the latest list against the combination of software versions of each of the ECUs obtained at step S100. The processing section 14 of the master ECU 10 then determines whether or not the software versions of each of the ECUs as recorded in the latest list are aligned with the software versions of the software actually operating in each of the ECUs.

At step S114, the processing section 14 of the master ECU 10 ends processing when the combination of software versions as recorded in the latest list is aligned with the combination of software versions obtained at step S100. However, the processing section 14 of the master ECU 10 transitions processing to step S116 when the combination of software versions as recorded in the latest list are not aligned with the combination of software versions obtained at step S100.

At step S116, the processing section 14 of the master ECU 10 performs operation alignment processing to align the software for operation in the master ECU 10, the slave ECU 20, or the slave ECU 30. Execution of the processing of step S116 means that the software versions of the latest list were not aligned with the software versions of the software actually operating in each of the ECUs. Thus due to being in a state in which the software actually operating in each of the ECUs is not the latest, i.e. due to being in a non-aligned state, processing is executed at step S116 to achieve alignment for the software actually operating in each of the ECUs.

Figure 8:
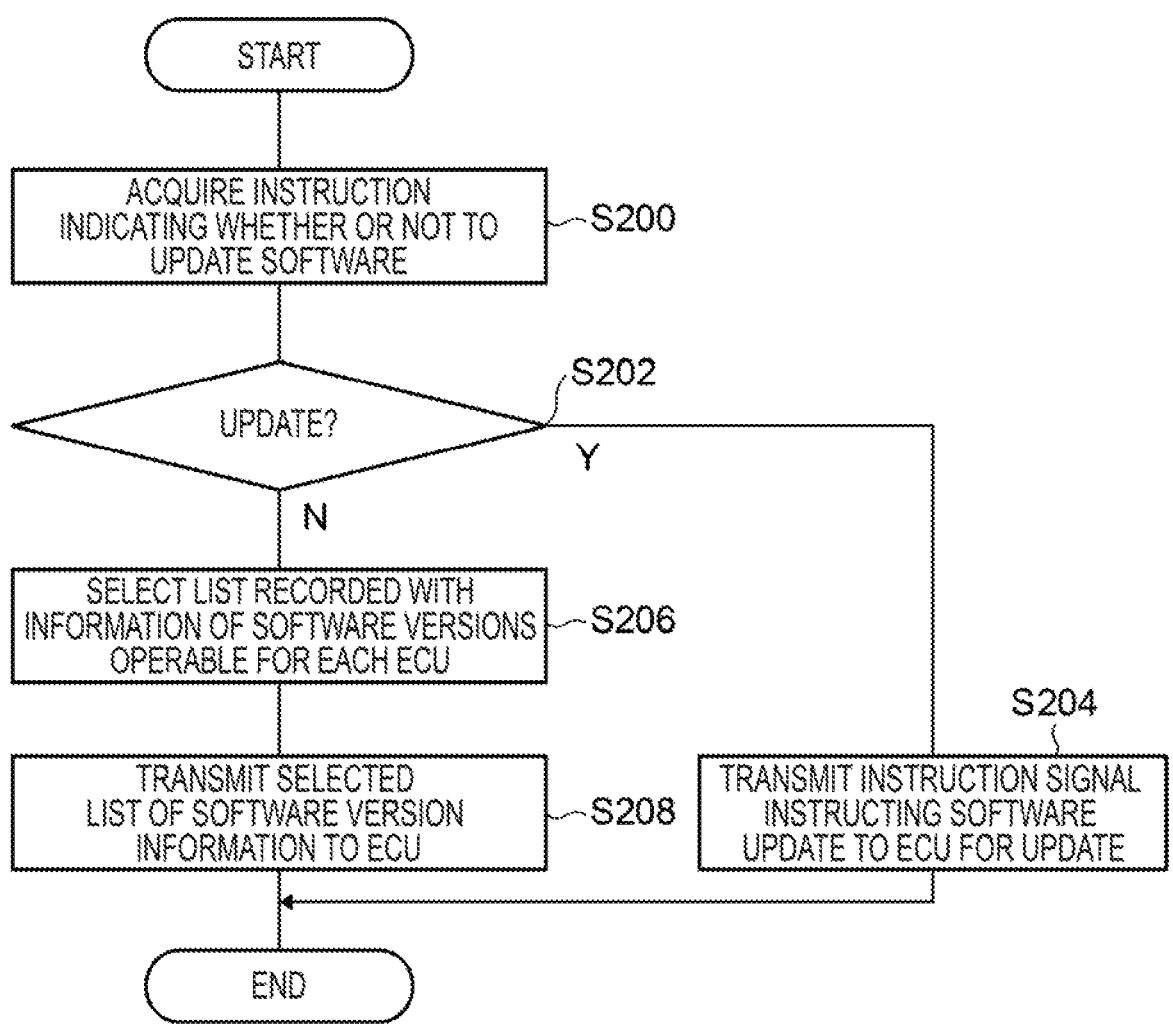
FIG. 8 is a flowchart illustrating an example of an operation alignment processing routine of the present embodiment.

At step S116 the operation alignment processing routine is implemented as illustrated in FIG. 8.

At step S200 illustrated in FIG. 8, the processing section 14 of the master ECU 10 presents the user with enquiry information related to whether or not to update the software of the ECU. The processing section 14 of the master ECU 10 acquires instruction information input by the user instructing whether or not to update the software of the ECU. The instruction information may be instruction information indicating whether or not to postpone update of the software.

At step S202 the processing section 14 of the master ECU 10 determines whether or not to update the software operating on the ECUs based on the instruction information acquired at step S200. Processing transitions to step S204 when the instruction information acquired at step S200 indicates to update the software. Processing transitions to step S206 when the instruction information acquired at step S200 indicates not to update the software.

At step S204, the processing section 14 of the master ECU 10 uses the communications section 16 to transmit an instruction signal instructing updating of software to the relevant ECUs with software to be updated. The ECUs receiving the instruction signal accordingly execute software update processing by OTA. The list stored in the list storage section of these ECUs is updated when the software of the ECU has been updated.

At step S204, the processing section 14 of the master ECU 10 updates the software for the master ECU 10 itself when the software version of the master ECU 10 indicates that this software version is older than the software version as recorded on the latest list.

At step S206, the processing section 14 of the master ECU 10 selects a list recorded with software versions that enable operation of each of the ECUs.

Take, for example as illustrated in FIG. 9, a case in which a list Lm is the latest list stored in the list storage section 12 of the master ECU 10. The respective software versions on each of the ECUs as recorded in the latest list Lm are "001" as the software version of the master ECU 10, "002" as the software version of the slave ECU 20, and "002" as the software version of the slave ECU 30. The software versions on each of the ECUs as recorded in a list Ls 20 held by the slave ECU 20 are the same as those on the list Lm.

However, the list Ls 30 held by the slave ECU 30 has "001" as the software version on each of the ECUs. The slave ECU 30 accordingly needs to execute software update processing by OTA, however, consider a case in which the software update processing has been postponed by instruction information from the user.

In such cases the master ECU 10 selects, for example, a list Lc from past lists stored in the list storage section 12. The list Lc is recorded with "001" as the software version operable on the slave ECU 30. Moreover, from out of the lists, the list Lc is the latest list in which "001" is recorded as the software version operable on the slave ECU 30.

The master ECU 10 outputs to the relevant ECUs instruction signals instructing operation under the corresponding software versions so as to achieve the combination of software versions as recorded in the selected list.

More specifically, at step S208 the processing section 14 of the master ECU 10 transmits to each of the relevant ECUs an instruction signal including the respective software version as recorded in the list selected at step S206. Thus the ECUs receiving the instruction signal including the software version do not perform software update processing, and instead operate under an older version of the software.

For example, consider a case in which the master ECU 10 outputs to the slave ECU 20 an instruction signal to change the software version of the software operating on the slave ECU 20 from "002" to "001". Fallback operation is then performed with the master ECU 10 operated with the software version "002" and the slave ECU 20 operated with the software version "001".

Explanation next follows regarding an example of operation of the present embodiment.

Operation Example 1

Figure 10:
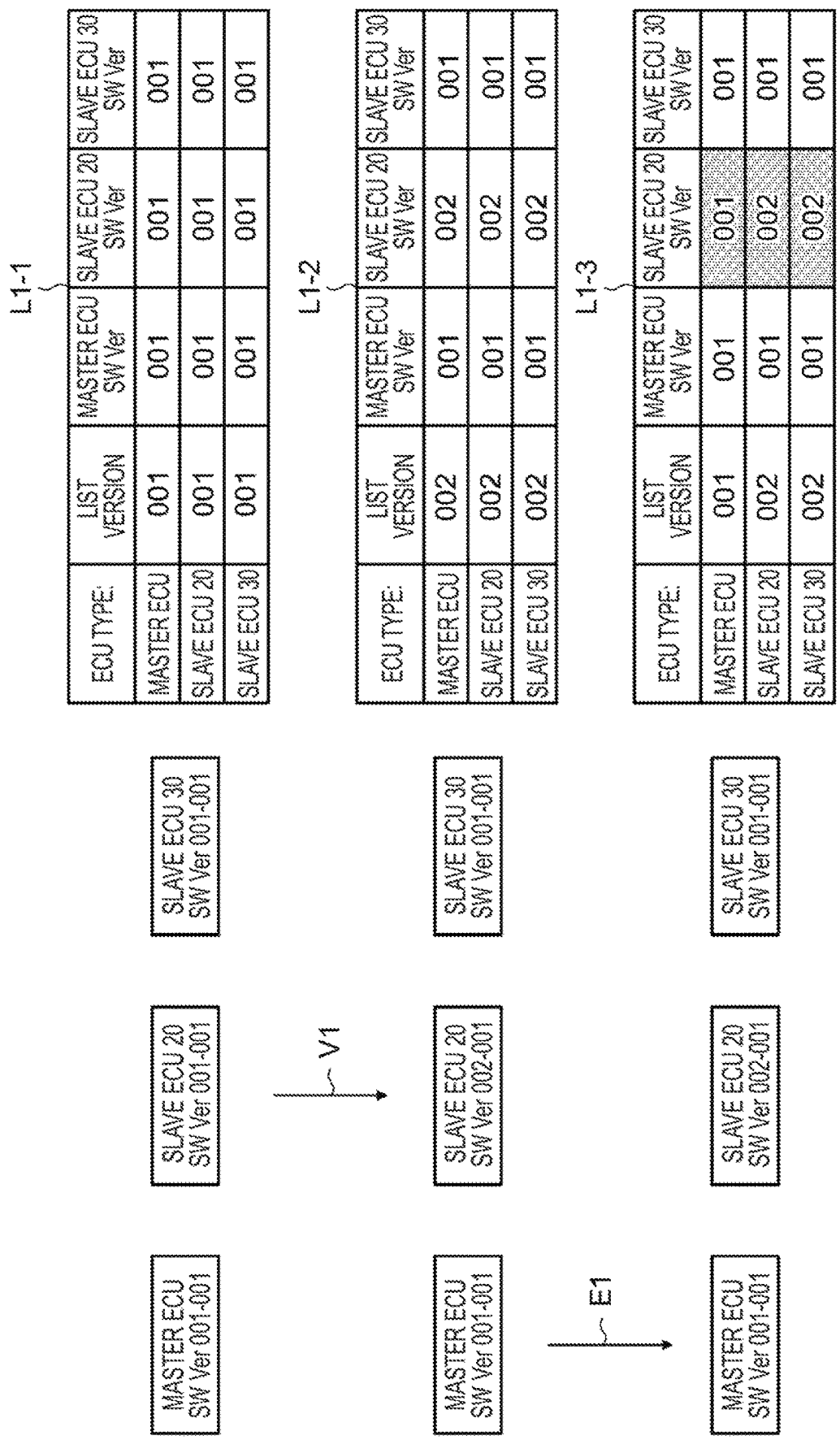
FIG. 10 is an explanatory diagram to explain an example of operation when the present embodiment is being applied.

In Operation Example 1 explanation will be given regarding a case in which the master ECU 10 has been exchanged. FIG. 10 is an explanatory diagram to explain Operation Example 1.

As illustrated in FIG. 10, the software version of the master ECU 10 is "001-001" when in the initial state. Note that within software version "XXX-YYY", only the "XXX" represents a software version subject to alignment, and so explanation follows using as the software version "XXX" alone.

As illustrated in FIG. 10, the software version of the slave ECU 20 is "001" when in the initial state. Similarly, the software version of the slave ECU 30 is "001" when in the initial state.

The software versions on each of the ECUs in the initial state are stored in the list storage section of each of the ECUs as illustrated in L1-1. Note that each row in L1-1 indicates one list. For example, the list storage section 12 for the ECU classification "master ECU" is stored with "001" as the list version and with "001" as the software version of the master ECU 10. Moreover, the list storage section 12 for the ECU classification "master ECU" is stored with "001" as the software version of the slave ECU 20 and with "001" as the software version of the slave ECU 30.

As illustrated in FIG. 10, when the software of the slave ECU 20 has been updated by version upgrade V1 and the software version has changed from "001" to "002" then the state of the lists held on each of the ECUs becomes that of L1-2. As indicated by the list state L1-2 of FIG. 10, the list version is changed from "001" to "002", and the software version of the slave ECU 20 is changed from "001" to "002".

When, as illustrated in FIG. 10, the master ECU 10 is replaced by exchange E1, then the state of the list held in each of the ECUs becomes that of L1-3. In such cases the list held by the master ECU 10 is that as initialized. More specifically, the list held in the master ECU 10 is now list version "001", in which "001" is the software version of the master ECU 10, "001" is the software version of the slave ECU 20, and "001" is the software version of the slave ECU 30. Thus, as illustrated in L1-3 of FIG. 10, the software versions recorded in the list held by the master ECU 10 are no longer aligned with the software versions of the slave ECU 20 and the slave ECU 30. Even though the software version actually operating the slave ECU 20 is "002", the master ECU 10 thinks that the software version of the slave ECU is "001", and so is not able to operate the onboard system 1.

Thus in order to start up the onboard system 1, the slave ECU 20 and the slave ECU 30 each transmit to the master ECU 10 the operating software version of the software actually operating in their own respective ECU and also the list version of the list they are each holding themselves. More specifically, at step S100 of FIG. 7, the software versions of the software actually operating and the list versions of the lists being held are transmitted to the master ECU 10.

More specifically, information such as that illustrated in FIG. 1 is transmitted to the master ECU 10. As illustrated in FIG. 1, the slave ECU 20 transmits to the master ECU "002" as the software version and "002" as the list version held by itself. Moreover, as illustrated in FIG. 11, the slave ECU 30 transmits to the master ECU 10 "001" as the software version and "002" as the list version held by itself.

Then at step S102 of FIG. 7, the master ECU 10 recognizes the list version of the list held by itself to be different from the list versions of the lists being held by slave ECU 20 and the slave ECU 30. Moreover, at step S104 the master ECU 10 recognizes that the list held by itself is older than the lists being held by the slave ECU 20 and the slave ECU 30.

Then at step S106 of FIG. 7, the master ECU 10 transmits a request signal to an ECU holding the latest list (for example, the slave ECU 20 or the slave ECU 30) requesting transmission of the list. More specifically, the master ECU 10 designates the list version of the latest list and transmits a request signal to the slave ECU 20 or the slave ECU 30.

Then at step S108 of FIG. 7, the master ECU 10 acquires the latest list. At step S110 of FIG. 7 the master ECU 10 also updates the list stored in the list storage section 12 to the latest list.

Then at step S112 of FIG. 7, the master ECU 10 verifies that the software versions as recorded in the latest list stored in the list storage section 12 are aligned with the software versions already acquired for each of the ECUs.

In the Operation Example 1, the list of the master ECU 10 has been updated to the latest list, and so the determination result at step S112 of FIG. 7 is that alignment has been achieved, and the processing is ended.

Operation Example 2

Figure 12:
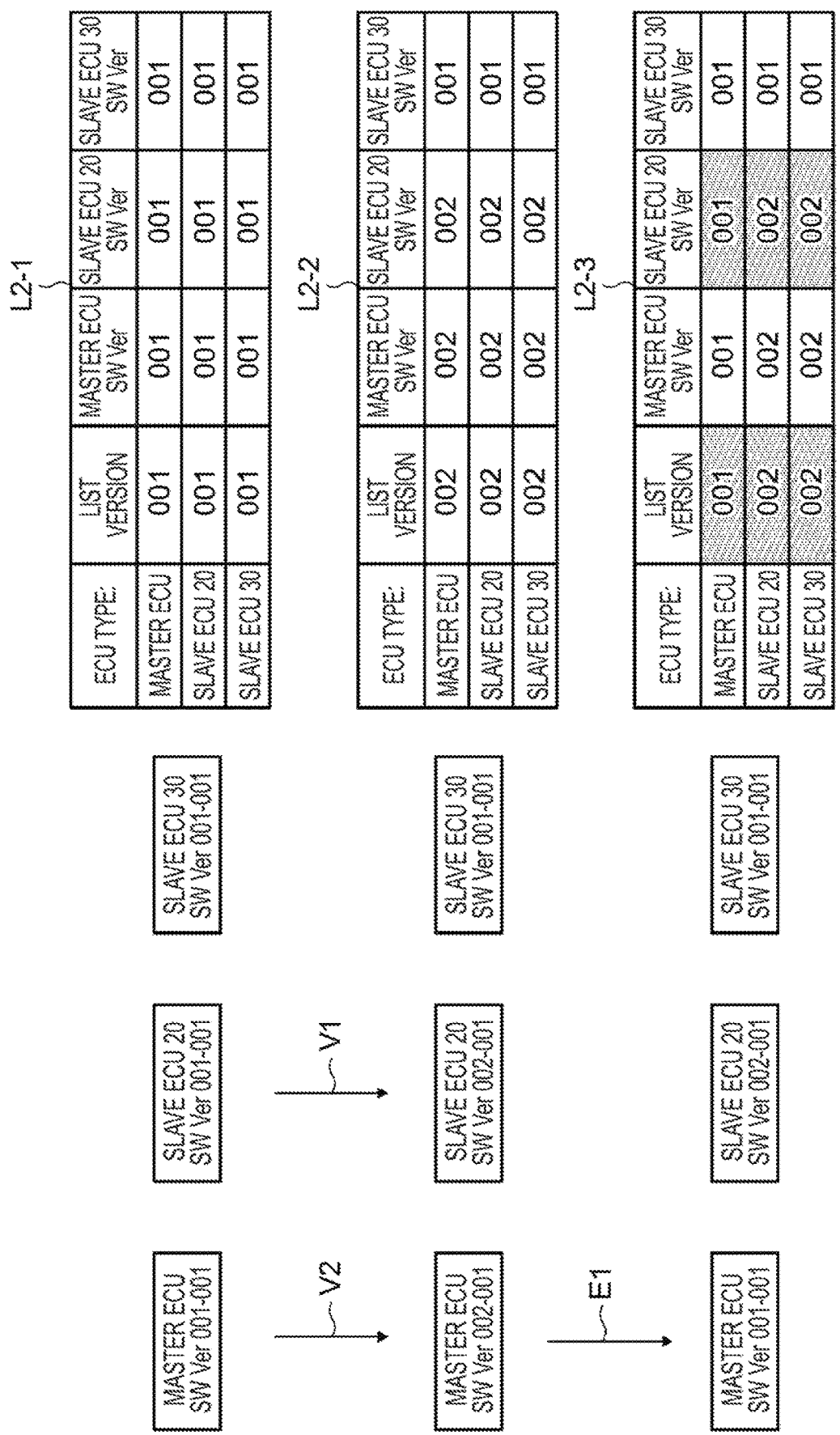
FIG. 12 is an explanatory diagram to explain an example of operation when the present embodiment is being applied.

In Operation Example 2 explanation will be given regarding a case in which the master ECU 10 has been exchanged after the software of the master ECU 10 has been updated and the software of the slave ECU 20 has been updated. FIG. 12 is an explanatory diagram to explain Operation Example 2.

Operation Example 2 is an example of operation for a case in which the master ECU 10 has been exchanged and is now a new master ECU 10, and the software actually operating the new master ECU 10 is now old software.

More specifically, the new master ECU 10 performs fallback operation by using older actual operating software in cases in which the operating software version of the new master ECU 10 is older than the operating software version of the old master ECU 10 that was exchanged.

Note that the new master ECU 10 performs fallback operation in cases in which postponement of software updating has been selected by the user. Moreover, for example, the new master ECU 10 may be configured to also perform fallback operation using actual operating software when a software update for the new master ECU 10 is unable to be performed within a predetermined period of time.

As illustrated in FIG. 12, the software version of the master ECU 10 in the initial state is "001". The software version of the slave ECU 20 in the initial state is also "001". The software version of the slave ECU 30 in the initial state is also "001". The software versions of each of the ECUs in the initial state are stored as L2-1 in the list storage sections of the respective ECUs.

As illustrated in FIG. 12, the software of the slave ECU 20 is updated by version upgrade V1, and the software version is changed from "001" to "002". The software of the master ECU 10 is also updated by version upgrade V2, and the software version is changed from "001" to "002". The list state L2-2 is thereby achieved.

Then, as illustrated in FIG. 12, when the master ECU 10 has been replaced by exchange E1 the state of the list held by each of the ECUs becomes that of L2-3.

In such cases, as illustrated by L2-3 in FIG. 12, the list version of the list held by the master ECU 10 is no longer aligned with the list version of the lists held by the slave ECU and the slave ECU 30. The software version actually operating on the master ECU 10 is also different to the software version of the master ECU 10 as recorded in the lists held by the slave ECU 20 and the slave ECU 30. The software versions recorded in the list held by the master ECU 10 are accordingly not aligned with the software versions of the slave ECU 20 and the slave ECU 30.

In such cases, at step S104 of FIG. 7, the list version of the list held by the master ECU 10 found to be older than the list version of the lists held by the slave ECU 20 and the slave ECU 30.

The master ECU 10 therefore updates the list recorded in the list storage section 12 to the latest list by performing the processing of step S106 to step S110.

At step S112 of FIG. 7, the master ECU 10 then compares the software versions recorded in the latest list against the software versions of the software actually operating in each of the ECUs. The result is a determination that the software version actually operating in the master ECU 10 is not aligned with the list version of the master ECU 10 in which the latest list is recorded.

The master ECU 10 accordingly executes the processing of step S116 of FIG. 7. A more detailed explanation will now be given regarding the processing of step S116 of FIG. 7.

At step S200 of FIG. 8, illustrating implementation of the processing of step S116 of FIG. 7, the master ECU 10 tells the user of a need to update by OTA. At step S200 of FIG. 8, the master ECU 10 acquires from the user instruction information to indicate whether or not to update the software.

Then when the instruction information from the user is to start up the onboard system 1 with updated software, an instruction to update software by OTA is transmitted to relevant ECUs at step S204 of FIG. 8. The relevant ECUs then execute software update by OTA.

However, at step S202 of FIG. 8, in cases in which the instruction information from the user is to postpone software update, fallback operation of the onboard system 1 is performed by step S206 and step S298.

For example, the master ECU 10 identifies the list corresponding to the oldest list version, and requests each of the ECUs to operate with the software of the software versions recorded in this list.

In such cases, at step S206 of FIG. 8, the master ECU 10 selects the oldest list based on the past list versions stored in the list storage section 12. Then at step S208 of FIG. 8 the master ECU 10 transmits to the relevant ECUs the software versions recorded in the selected list. The ECUs that have received these software versions then perform fallback operation using the software corresponding to the received software versions.

However, software update by OTA is requested for the relevant ECUs when, in such cases, there is no list out of the lists stored in the list storage section 12 of the master ECU 10 that conforms to the operation of the each of the ECUs. Moreover, software update processing by OTA is similarly executed also in cases in which the ECUs are not able to operate with software corresponding to the software versions requested by the master ECU 10.

In the Operation Example 2, the master ECU 10 selects a list from the past lists stored in the list storage section 12 when postponement of software update is selected by the user. More specifically, the master ECU 10 selects from the lists stored in the list storage section 12 a list that conforms to the software versions of each of the ECUs including itself.

In the example of FIG. 12, the master ECU 10 selects the list corresponding to the list version "001". The master ECU 10 then transmits the selected list having the software version "001" for each of the ECUs to the slave ECU 20 and the slave ECU 30. The slave ECU 20 and the slave ECU 30 then perform fallback operation with the software corresponding to the received software version "001". The slave ECU 20 that originally had software version "002" accordingly performs fallback operation using the software version "001" recorded in the list corresponding to the list version "001".

Operation Example 3

In Operation Example 3 explanation will be given of a case in which the master ECU 10 has been exchanged after the software of the master ECU 10 has been updated. FIG. 13 is an explanatory diagram to explain Operation Example 3.

As illustrated in FIG. 13, the software version of the master ECU 10 is "001" in the initial state. The software version of the slave ECU 20 is also "001" in the initial state. The software version of the slave ECU 30 is also "001" in the initial state. The software versions of each of the ECUs in the initial state are stored as illustrated at L3-1 in the list storage section of each of the ECUs.

As illustrated in FIG. 13, the software of the master ECU 10 is changed in software version from "001" to "002" by updating in version upgrade V2. The state of the list held in each of the ECUs thereby becomes that of L3-2.

Next, as illustrated in FIG. 13, the software version of the master ECU 10 is changed from "002" to "001" when the master ECU 10 has been replaced by the exchange E1. The state of the lists held in the ECUs becomes that of L3-3.

In such cases, as illustrated by L3-3 in FIG. 13, the list version of the list held by the master ECU 10 is no longer aligned with the list version of the lists held by the slave ECU and the slave ECU 30. The list is accordingly updated by performing step S106 to step S110 of FIG. 7. However, even when the list held by the master ECU 10 has been updated, the software version of the master ECU 10 still remains as "001". Thus at step S116 illustrated in FIG. 7, the software of the master ECU 10 is updated by OTA, or fallback operation is performed using actually operable software. When the software version of the master ECU 10 has been updated from "001" to "002" the state of the list held by each of the ECUs becomes that of L3-4.

Operation Example 4

Figure 14:
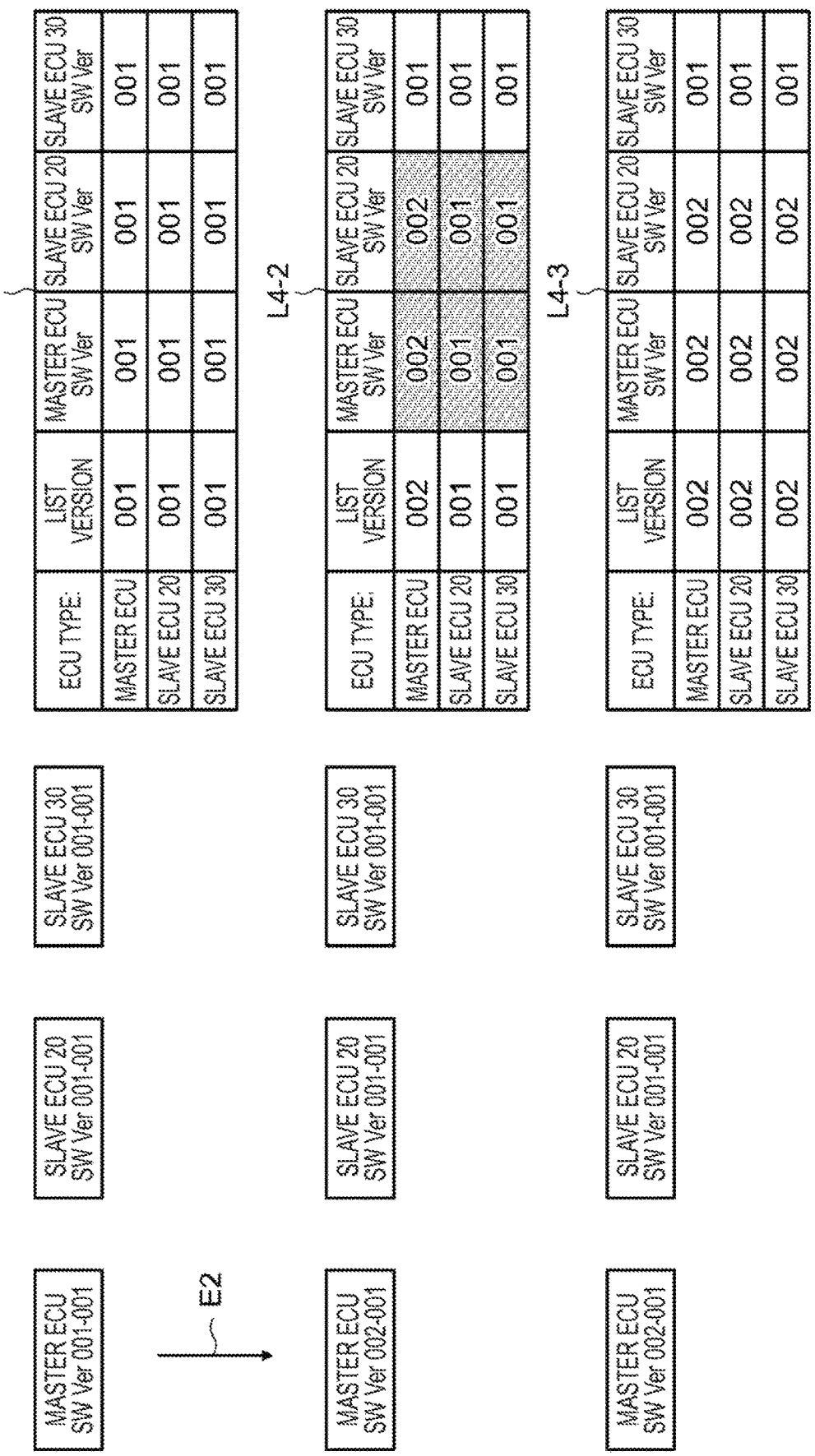
FIG. 14 is an explanatory diagram to explain an example of operation when the present embodiment is being applied.

In an Operation Example 4 explanation will be given of a case in which the master ECU 10 is exchanged, and the software of the master ECU 10 is also updated in the exchange. FIG. 14 is an explanatory diagram to explain Operation Example 4.

As illustrated in FIG. 14, in the initial state the software version of the master ECU is "001", the software version of the slave ECU 20 is "001", and the software version of the slave ECU 30 is "001". The software versions of each of the ECUs in the initial state are stored in the list storage sections of the ECUs as illustrated in L4-1.

As illustrated in FIG. 14, the software version of the master ECU 10 is changed from "001" to "002" in the exchange when the master ECU 10 has been replaced by exchange E2. The state of the list held by each of the ECUs accordingly becomes that of L4-2.

In the list state L4-2 illustrated in FIG. 14, the list stored in the list storage section 12 of the master ECU 10 is also exchanged. Thus in the list state L4-2, the software version "002" of the master ECU 10 as recorded in the list held by the master ECU 10 is not aligned with the software version "001" of the master ECU 10 as recorded in the lists held by each of the slave ECUs.

Moreover, in the list state L4-2, the software version "002" of the slave ECU 20 as recorded in the list held by the master ECU 10 is not aligned with the software version "001" of the slave ECU 20 as recorded in the lists held by each of the slave ECUs.

In such cases, at step S204 of FIG. 8, the master ECU 10 transmits an instruction signal instructing software update to the slave ECU 20. The slave ECU 20 receiving the instruction signal instructing software update performs software update by OTA to update the software version from "001" to "002". Similarly, the master ECU 10 also transmits an instruction signal instructing software update to the slave ECU 30. The slave ECU 30 receiving the instruction signal instructing software update performs software update by OTA to update the software version from "001" to "002". The state of the lists held by the ECUs accordingly becomes that of L4-3.

Moreover, when at step S200 illustrated in FIG. 8 the user has postponed software update, the master ECU 10 selects from the past lists recorded in the list storage section 12 the list of list version "001", this being a list conforming to operation of each of the ECUs. The master ECU 10 performs fallback to change the software version of its own software from "002" to "001" and operates. This results in operation performed as the onboard system being that corresponding to list version "001".

Operation Example 5

In Operation Example 5 explanation will be given of a case in which the slave ECU 30 has been exchanged after the software of the slave ECU 20 has been updated. FIG. is an explanatory diagram to explain Operation Example 5.

Figure 15:
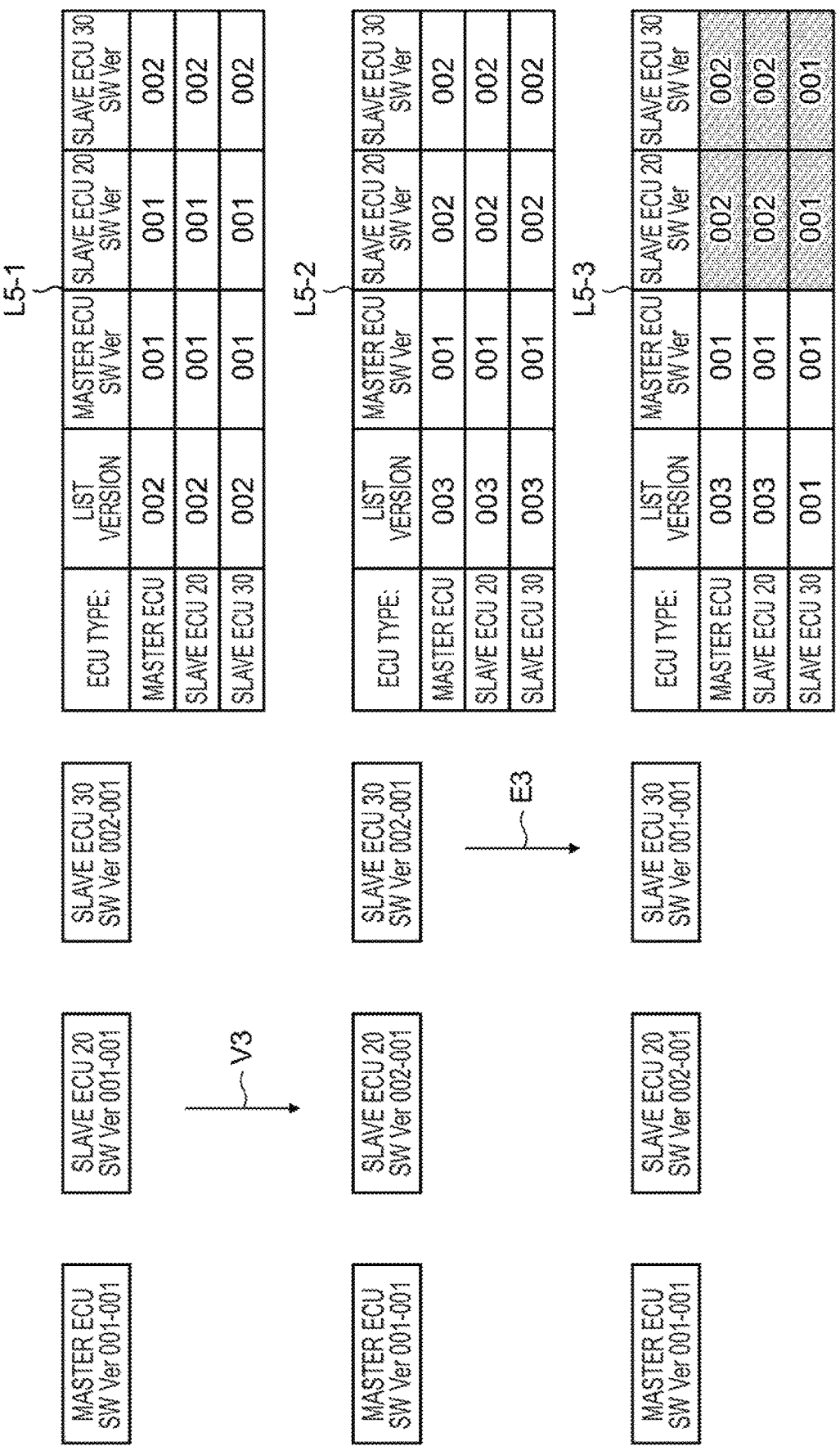
FIG. 15 is an explanatory diagram to explain an example of operation when the present embodiment is being applied.

As illustrated in FIG. 15, the software versions of each of the ECUs in the initial state are stored as L5-1 in the list storage section of each of the ECUs.

As illustrated in FIG. 15, when the software of the slave ECU 20 has been updated in version upgrade V3, the software version of the slave ECU 20 changes from "001"

to "002". The state of the list held by each of the ECUs accordingly becomes that of L5-2.

Next, as illustrated in FIG. 15, when the slave ECU 30 has been replaced by exchange E3, the list held by the slave ECU 30 is that as initialized, and the state of the lists held by the ECUs is as illustrated in L5-3.

In such cases, as illustrated by L5-3 in FIG. 15, the software version "002" of the slave ECU 30 as recorded in the list held by the master ECU 10 is not aligned with the software version "001" of the slave ECU 30.

A determination is accordingly made at step S112 of FIG. 7 that the software versions of each of the ECUs are not aligned, and the operation alignment processing of step S116 is executed.

Then at step S200 of FIG. 8, the master ECU 10 transmits an instruction signal instructing software update to the slave ECU 30 when the instruction information input by the user is an instruction to update software. The slave ECU 30 receiving the instruction signal instructing software update then performs software update by OTA to update the software version from "001" to "002".

However, when the user has postponed software update at step S200 of FIG. 8, the master ECU 10 selects from the past lists recorded in the list storage section 12 a list with list version "001" that is a list conforming to operation of each of the ECUs. The master ECU then transmits an instruction signal instructing software fallback operation to the slave ECU 20. The slave ECU 20 performs software fallback operation corresponding to the received software version "001". Operation corresponding to list version "001" is accordingly performed by the onboard system.

Operation Example 6

Figure 16:
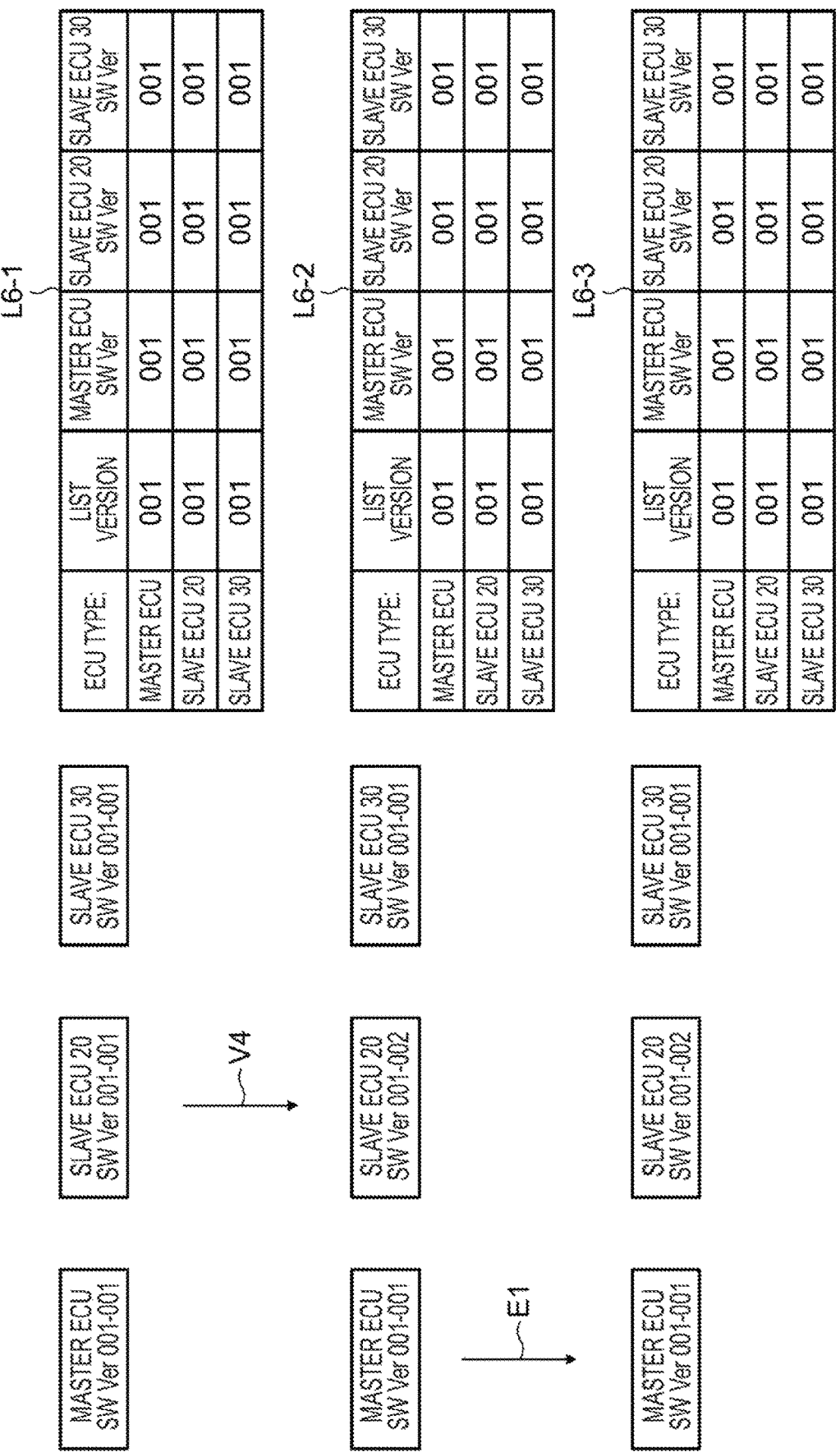
FIG. 16 is an explanatory diagram to explain an example of operation when the present embodiment is being applied.

In Operation Example 6 explanation will be given of a case in which the master ECU 10 has been exchanged after software not influencing other ECUs has been updated in the software of the slave ECU 20. FIG. 16 is an explanatory diagram to explain Operation Example 6.

As illustrated in FIG. 16, the state of each of the lists stored in the list storage section of each of the ECUs in the initial state is that of L6-1.

As illustrated in FIG. 16, when update V4 has been performed on the software of the slave ECU 20, the software version of software not influencing other ECUs from out of the software of the slave ECU 20 is changed from "001" to "002". The software versions that are stored in the list are, however, software versions of software influencing other ECUs. Thus although the state of the list held by each of the ECUs becomes that of L6-2 due to the software update V4, this state is the same as the state L6-1.

Next, as illustrated in FIG. 16, when the master ECU 10 has been replaced by exchange E1, the state of the list held by each of the ECUs is changed to that of L6-3. The software version of the master ECU 10 is still "001" in this case too, and so the list state L6-3 is still the same as that of L6-2 and L6-1. In this case there is alignment in the software versions of each of the ECUs, and so no lack of matching arises between the list versions.

Operation Example 7

Figure 17:
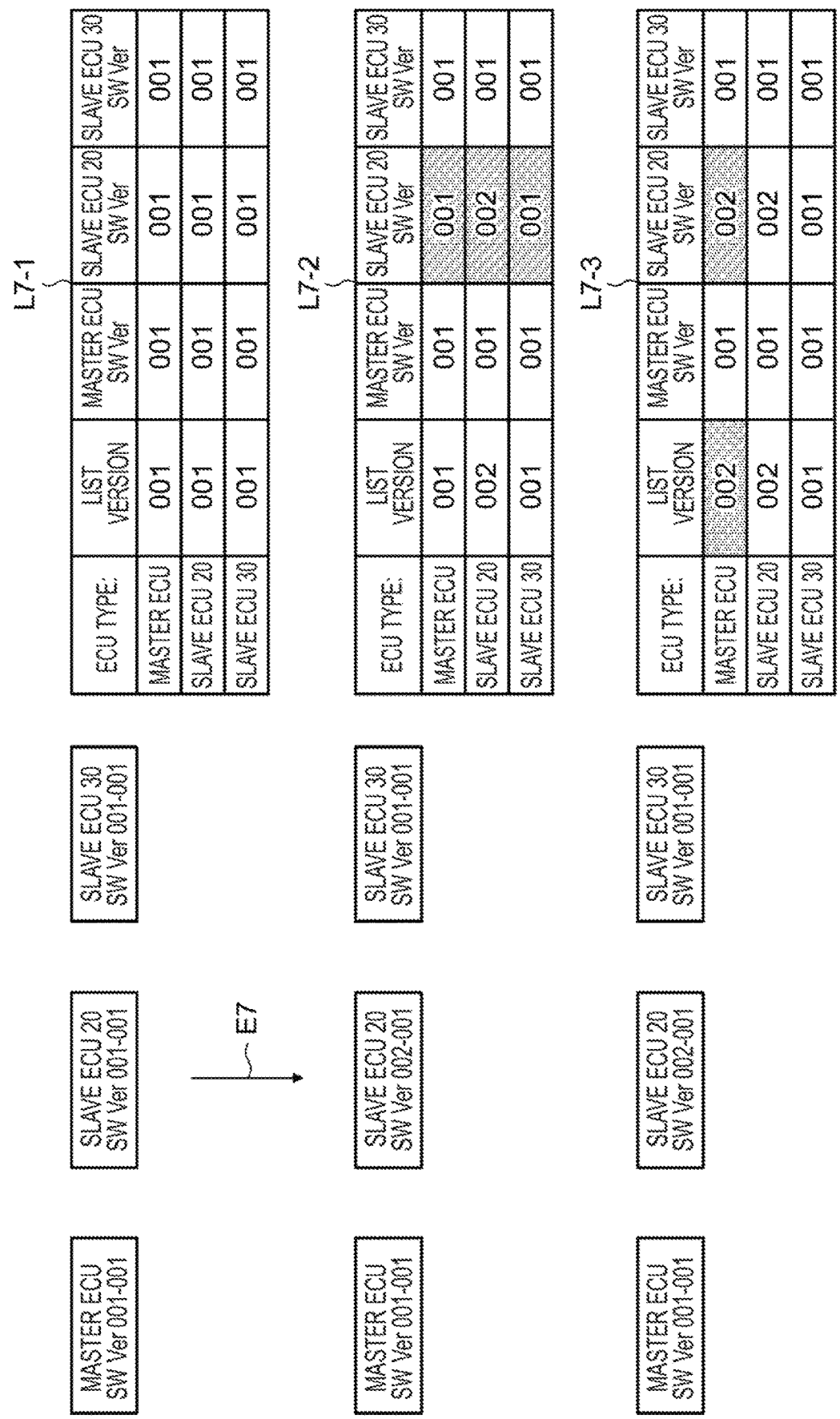
FIG. 17 is an explanatory diagram to explain an example of operation when the present embodiment is being applied.

In Operation Example 7 explanation will be given of a case in which the slave ECU 20 has been exchanged and the list held by the slave ECU 20 is updated by the exchange. FIG. 17 is an explanatory diagram to explain Operation Example 7.

As illustrated in FIG. 17, the state of each of the lists stored in the list storage sections of each of the ECUs in the initial state is that of L7-1.

As illustrated in FIG. 17, when exchange E7 of the slave ECU 20 has been performed, the list held by the slave ECU 20 is also updated by the exchange E7. The list version of the list held by the slave ECU 20 is updated in such cases from "001" to "002". The software version of the software of the slave ECU 20 is also updated from "001" to "002".

The processing of step S106 to step S110 of FIG. 7 is executed in such cases, the list of the list storage section 12 of the master ECU 10 is updated to the list of list version "002", this being the latest list as held by the slave ECU 20. The state of each of the lists stored in the list storage section of each of the ECUs is thereby changed to that of L7-3. More specifically, the list version of the list held by the master ECU 10 is changed to "002", and the software version of the slave ECU 20 recorded in this list is changed to "002" so that the state of each of the lists is that as listed in L7-3.

In such cases, the list version "002" of the master ECU 10 and the slave ECU 20 do not match the list version "001" of the slave ECU 30. However, in the list of the latest list version "002", the software version of the slave ECU 30 is "001", and this is the same as the software version "001" of the slave ECU 30 in the list of the older list version "001". The combination of software versions actually in each of the ECUs accordingly matches the combination of software versions recorded in the latest list, and so the master ECU 10 determines there to be no need to update software. The list held by the slave ECU 30 is accordingly not updated and the processing is ended.

Note that sometimes all of the ECUs in the onboard system 1 are exchanged, and alignment is achieved by a combination of old software versions. In such cases list synchronization is also performed at verification of software update by normal OTA.

As explained above, when the onboard system 1 is started up, the master ECU of the onboard system according to the present embodiment acquires the software versions of each of plural slave ECUs and acquires the list versions of the lists stored in the list storage sections for each of the plural ECUs. The master ECU then compares the list version stored in the list storage section of the master ECU against the list versions acquired from the list storage sections of each of the slave ECUs so as to identify the latest list therein. The master ECU then compares the combination of software versions in each of the ECUs as recorded in the latest list against the combination of the software versions of each of plural slave ECUs and the software version of the master ECU. The master ECU then determines whether or not the combination of software versions as recorded in the latest list are aligned with the combination of the software of the master ECU and the software of the plural slave ECUs. This thereby enables the combination of software operating on the plural ECUs to be verified even in cases in which an ECU managing the software of the plural ECUs has been exchanged.

The onboard system of the present embodiment enables alignment of software to be achieved across each of the ECUs even without interrogation of an external server or the like when the onboard system is started up, due to holding lists on the vehicle-side system. Verification for operation of a vehicle can accordingly be made even without communicating with an external server.

Holding the list on all the ECUs provided to the onboard system enables software alignment to be verified using a list held by another slave ECU even in an environment in which a master ECU has been exchanged and the list was not updated when the master ECU was exchanged.

Moreover, alignment is maintained merely by updating the list held by the master ECU, enabling the omission of interrogation of an external server to update the list.

Moreover, for managing software versions, managing the software versions according to whether or not there is an influence on other ECUs enables alignment verification to be performed easily even when version upgrade has been performed of software in a closed environment within an ECU.

Although an embodiment has been explained above in which each of the programs is pre-stored (pre-installed) on a storage section, there is no limitation thereto. The programs according to the technology disclosed herein may be provided in a format recorded on a recording medium such as a compact disc-read only memory (CD-ROM), digital versatile disc (DVD), universal serial bus (USB) memory, or the like.

All publications, patent applications and technical standards mentioned in the present specification are incorporated by reference in the present specification to the same extent as if each individual publication, patent application, or technical standard was specifically and individually indicated to be incorporated by reference.

Explanation follows regarding modified examples of the embodiments.

Although in the above embodiments explanation has been given regarding an example of cases in which the software version is employed as an example of software identification information, there is no limitation thereto. For example, information about the time when the software was produced may be employed as the software identification information.

Moreover, although in the above embodiments explanation has been given regarding an example of cases in which the list version is employed as an example of list identification information, there is no limitation thereto. For example, information about the time when the list was produced may be employed as the list identification information.

An aspect of technology disclosed herein exhibits the advantageous effect of being able to verify a combination of software to operate plural ECUs even in cases in which an ECU holding a list for managing software of the plural ECUs has been exchanged.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An onboard system comprising:
    a plurality of electronic control units (ECUs) coupled together via a network and including a first ECU and a second ECU, the first ECU including a first memory and a first processor coupled to the first memory, the second ECU including a second memory and a second processor coupled to the second memory, wherein,
    the first memory and the second memory configured to store a list recording a combination of identification information of software of the plurality of ECUs,
    the first processor is configured to:
    in response to starting up the onboard system, compare identification information of the list stored in the first memory against identification information of the list stored in the second memory and identify a newest list which is newer in the lists, and
    determine whether or not a combination of software of the plurality of ECUs is aligned based on a combination of the software identification information recorded in the identified list,
    wherein, when the first ECU has been exchanged and is a new first ECU, in a case in which the software identification information of software of the new first ECU is found to be older than the identification information of software of the exchanged first ECU and an update of the software of the new first ECU is not able to be performed within a predetermined period of time, the new first ECU performs a fallback operation using software that is actually operating, and
    wherein, in a case of performing the fallback operation, the new first ECU selects the newest list of recorded software versions in which a plurality of second ECUs can operate, the new first ECU outputs a signal to the plurality of second ECUs indicating that it will perform the fallback operation with the software version listed in the selected list, and the new first ECU and the plurality of second ECUs perform the fallback operation with the software version listed in the selected list.

2. The onboard system of claim 1, wherein in a case in which it is found, from the comparison of the list identification information stored in the first memory against the list identification information acquired from the second memory, that the list identification information stored in the first memory is older than the list identification information acquired from the second memory, the first processor updates the list in the first memory with a newer list of lists stored in respective second memories of a plurality of second ECUs.

3. The onboard system of claim 1, wherein:
    in a case in which a combination of software of the first ECU and of a plurality of second ECUs is not aligned, the first processor outputs an instruction signal instructing updating of software to an ECU having software for updating so as to achieve a combination of the software identification information as recorded on a newer list.

4. The onboard system of claim 1, wherein the list stored in the second memory is updated in a case in which the software of the second ECU has been updated.

5. The onboard system of claim 1, wherein the first processor compares the software identification information of the software of the first ECU against the software identification information of the software of the first ECU as recorded in a newer list, and updates software of the first ECU in a case in which the software identification information of the software of the first ECU is found to be older than the software identification information of the first ECU as recorded in the newer list.

6. The onboard system of claim 1, wherein:
    the software identification information is information expressing a version of software or is information expressing a time at which software was produced; and
    the list identification information is information expressing a version of a list or is information expressing a time at which a list was produced.

7. An electronic control unit (ECU) comprising:
a memory; and
a processor coupled to the memory, the processor being configured to perform a process comprising:
   in response to starting up an onboard system in which a plurality of electronic control units (ECUs) are coupled together over a network, comparing identification information of lists that are stored on respective memories of the plurality of ECUs, and identifying a newest list which is newer in the lists, and
   determining whether or not a combination of software of the plurality of ECUs is aligned based on a combination of the software identification information recorded in the identified list,
wherein, when the first ECU has been exchanged and is a new first ECU, in a case in which the software identification information of software of the new first ECU is found to be older than the identification information of software of the exchanged first ECU and an update of the software of the new first ECU is not able to be performed within a predetermined period of time, the new first ECU performs a fallback operation using software that is actually operating, and
wherein, in a case of performing the fallback operation, the new first ECU selects the newest list of recorded software versions in which a plurality of second ECUs can operate, the new first ECU outputs a signal to the plurality of second ECUs indicating that it will perform the fallback operation with the software version listed in the selected list, and the new first ECU and the plurality of second ECUs perform the fallback operation with the software version listed in the selected list.

8. The ECU of claim 7, wherein, in the process:
in a case in which it is found, from a comparison of identification information of the list stored in a memory of the ECU against identification information of the list acquired from a memory of another ECU, that the list identification information stored in the memory of the ECU is older than the list identification information acquired from the memory of the other ECU, the ECU updates the list in the storage section of the ECU with a newer list of lists stored in respective memories of a plurality of other ECUs.

9. The ECU of claim 7, wherein, in the process:
in a case in which a combination of software of the ECU and a plurality of other ECUs is not aligned, the ECU outputs an instruction signal instructing updating of software to an ECU having software for updating so as to achieve a combination of the software identification information as recorded on a newer list.

10. The ECU of claim 7, wherein, in the process:
the list stored in the memory of another ECU is updated when software of the other ECU has been updated.

11. The ECU of claim 7, wherein, in the process:
the ECU compares the software identification information of the software of the ECU against the software identification information of the software of the ECU as recorded in a newer list, and updates software of the ECU in a case in which the software identification information of the software of the ECU is found to be older than the software identification information of the ECU as recorded in the newer list.

12. The ECU of claim 7, wherein, in the process:
the software identification information is information expressing a version of software or is information expressing a time at which software was produced; and the list identification information is information expressing a version of a list or is information expressing a time at which a list was produced.

13. An information processing method for execution in an onboard system configured by a plurality of electronic control units (ECUs) coupled together via a network and including a first ECU and a second ECU, the first ECU including a first memory and a first processor coupled to the first memory, the second ECU including a second memory and a second processor coupled to the second memory, wherein,
   the first memory and the second memory configured to store a list recording a combination of identification information of software of the plurality of ECUs,
   by the first processor,
   in response to starting up the onboard system, comparing identification information of the list as stored in the first memory against identification information of the list stored in the second memory and identifying a newest list which is newer in the lists, and
   determining whether or not a combination of software of the plurality of ECUs is aligned based on a combination of the software identification information recorded in the identified list,
wherein, when the first ECU has been exchanged and is a new first ECU, in a case in which the software identification information of software of the new first ECU is found to be older than the identification information of software of the exchanged first ECU and an update of the software of the new first ECU is not able to be performed within a predetermined period of time, the new first ECU performs a fallback operation using software that is actually operating, and
wherein, in a case of performing the fallback operation, the new first ECU selects the newest list of recorded software versions in which a plurality of second ECUs can operate, the new first ECU outputs a signal to the plurality of second ECUs indicating that it will perform the fallback operation with the software version listed in the selected list, and the new first ECU and the plurality of second ECUs perform the fallback operation with the software version listed in the selected list.

14. The information processing method of claim 13, wherein, in a case in which it is found, from the comparison of the list identification information stored in the first memory against the list identification information acquired from the second memory, that the list identification information stored in the first memory is older than the list identification information acquired from the second memory, the list in the first memory is updated with a newer list of lists stored in respective second memories of a plurality of second ECUs.

15. The information processing method of claim 13, wherein,
   in a case in which a combination of software of the first ECU and of a plurality of second ECUs is not aligned, an instruction signal instructing updating of software is output to an ECU having software for updating so as to achieve a combination of the software identification information as recorded on a newer list.

16. The information processing method of claim 13, wherein,
   the list stored in the second memory is updated in a case in which the software of the second ECU has been updated.

17. The information processing method of claim 13, wherein, the first processor compares the software identification information of the software of the first ECU against the software identification information of the software of the first ECU as recorded in a newer list, and updates software of the first ECU in a case in which the software identification information of the software of the first ECU is found to be older than the software identification information of the first ECU as recorded in the newer list.

18. The information processing method of claim 13, wherein,
the software identification information is information expressing a version of software or is information expressing a time at which software was produced; and
the list identification information is information expressing a version of a list or is information expressing a time at which a list was produced.

19. The information processing method of claim 13, wherein:
the first memory of the first ECU and the second memory of the plurality of ECUs store the newest list and a plurality of lists older than the newest list, and
in a case of performing the fallback operation, the new first ECU selects the newest list in which the plurality of second ECUs that are operable on software versions are recorded, from the plurality of lists stored in the first memory and the second memory, the new first ECU outputs a signal to the plurality of second ECUs indicating that it will perform the fallback operation with the software version listed in the selected list, and the new first ECU and the plurality of second ECUs perform the fallback operation with the software version listed in the selected list.

20. The onboard system of claim 1, wherein:
the first memory of the first ECU and the second memory of the plurality of second ECUs store the newest list and a plurality of lists older than the newest list, and
in a case of performing the fallback operation, the new first ECU selects the newest list in which the plurality of second ECUs that are operable on software versions are recorded, from the plurality of lists stored in the first memory and the second memory, the new first ECU outputs a signal to the plurality of second ECUs indicating that it will perform the fallback operation with the software version listed in the selected list, and the new first ECU and the plurality of second ECUs perform the fallback operation with the software version listed in the selected list.

21. The ECU of claim 7, wherein:
the first memory of the first ECU and the second memory of the plurality of second ECUs store the newest list and a plurality of lists older than the newest list, and
in a case of performing the fallback operation, the new first ECU selects the newest list in which the plurality of second ECUs that are operable on software versions are recorded, from the plurality of lists stored in the first memory and the second memory, the new first ECU outputs a signal to the plurality of second ECUs indicating that it will perform the fallback operation with the software version listed in the selected list, and the new first ECU and the plurality of second ECUs perform the fallback operation with the software version listed in the selected list.

* * * * *